United States Patent [19]

Shishido et al.

[11] Patent Number: 5,597,432
[45] Date of Patent: Jan. 28, 1997

[54] METHOD FOR MAKING BALLS FOR SPORTS

[75] Inventors: Hideomi Shishido; Shigeo Doi; Masanori Hirakiuchi; Hajime Okimoto, all of Hiroshima, Japan

[73] Assignee: Molten Corporation, Hiroshima-ken, Japan

[21] Appl. No.: 338,896

[22] Filed: Nov. 14, 1994

Related U.S. Application Data

[62] Division of Ser. No. 98,198, Jul. 28, 1993, abandoned.

[30] Foreign Application Priority Data

Jul. 31, 1992 [JP] Japan ................................ 4-224948
Nov. 11, 1992 [JP] Japan ................................ 4-327385

[51] Int. Cl.⁶ .................................................. B65H 54/64
[52] U.S. Cl. ...................... 156/170; 242/435; 473/605
[58] Field of Search ................. 156/170; 242/3; 273/65 EB, 58 BA, 58 R; 57/18, 12, 225

[56] References Cited

U.S. PATENT DOCUMENTS

| | | | |
|---|---|---|---|
| 726,503 | 4/1903 | Browning et al. | 273/65 EB |
| 2,061,021 | 11/1936 | Chittenden et al. | 57/18 X |
| 2,210,883 | 8/1940 | Chittenden et al. | 57/18 |
| 2,789,821 | 4/1957 | Crowley | 273/65 EB |
| 2,804,745 | 9/1957 | Foster | 57/225 |
| 3,009,311 | 11/1961 | Wang | 57/225 |
| 3,098,347 | 7/1963 | Smith | 57/18 X |
| 3,130,974 | 4/1964 | Muccino | 242/3 |
| 4,150,529 | 4/1979 | Northup | 57/18 X |
| 4,191,375 | 3/1980 | Uruba et al. | 156/170 X |
| 4,226,076 | 10/1980 | Griset, Jr. | 57/12 |
| 4,333,648 | 6/1982 | Aoyama | 156/170 X |
| 4,998,403 | 3/1991 | Bailey | 57/18 |

FOREIGN PATENT DOCUMENTS

| | | | |
|---|---|---|---|
| 1028583 | 5/1953 | France . | |
| 2221799 | 11/1973 | Germany . | |
| 52-32292 | 8/1977 | Japan | 273/65 EB |
| 54-34950 | 3/1979 | Japan . | |
| 55-103877 | 8/1980 | Japan . | |
| 56-15769 | 2/1981 | Japan . | |
| 647109 | 2/1994 | Japan | 273/65 EB |

*Primary Examiner*—Jeff H. Aftergut
*Attorney, Agent, or Firm*—Flynn, Thiel, Boutell & Tanis, P.C.

[57] ABSTRACT

A method for making a ball for sports comprises providing a round rubber tube, forming a reinforcing layer of a yarn wound about the tube, forming a rubber cover layer formed on the reinforcing layer, and vulcanizing the rubber cover layer to provide a carcass. In the method, the reinforcing layer is formed by winding, in combination, a covered yarn made of a urethane elastomer core thread wound thereabout with a synthetic resin filament or in combination with the synthetic resin filament and a yarn made of a member selected from the group consisting of cotton, polyesters and polyamides. The carcass may be attached with a skin layer made of a natural or artificial leather. Alternatively, the round rubber tube having the reinforcing layer may be attached with a skin layer.

17 Claims, 6 Drawing Sheets

FIG. 1

(a) NYLON FILAMENT
(b) NYLON PROCESSED YARN
(c) NYLON COVERED YARN
(d) SPANDEX

METHOD FOR MAKING BALLS FOR SPORTS

This application is a division of U.S. Ser. No. 08/098,198, filed Jul. 28, 1993, now abandoned.

BACKGROUND OF THE INVENTION

1. Field of the Invention

This invention relates to balls for sports which have a reinforcing layer of a yarn wound about a rubber tube and more particularly, to a method for making such a ball as mentioned above.

2. Prior Art

Ball games using a soft volleyball, etc. as leisure sports are popular to people regardless of age or sex wherein the soft volleyball uses a rubber ball comprising a single layer rubber. However, the rubber ball of this type has following problems. The rubber ball has no reinforcing properties and is deformed or swollen when it is used for a couple of hours. If the inner pressure of the ball exceeds 0.1 kg/cm$^2$, the rubber ball is swollen anomalously. Furthermore, if the rubber balls are accommodated in a basket, etc. in which the rubber balls are heaped up in a multiple layers, those positioned on the lowest layer receive high pressure, which causes the lack of durability thereof such as deformation or breakage thereof.

Bonded balls have been heretofore made in the following manner. Initially, a round rubber tube is endlessly wound with 3,000 to 4,000 meters of a 50 to 200 denier polyester or nylon (polyamide) filament. The thus wound tube is then covered with a rubber cover, followed by vulcanization in a mold at a temperature of 150° to 180° C., thereby obtaining a so-called carcass. If the mold has been preliminarily marked with a panel shape and an emboss design, the resultant carcass per se can be provided as a rubber ball. Alternatively, when a chloroprene rubber adhesive is applied to the carcass and attached with a skin material such as a natural, artificial or synthetic material, there is obtained a so-called leather ball. Although this bonded ball has good durability, there is the problem that the ball is so hard that when it hits one on the fingers or arm, one feels a pain. Thus, the ball is poorer in the touch than sewn balls.

In order to overcome the above problems, Japanese Laid-open Patent Application No. 55-103877 sets forth a ball which has a round rubber tube, a nylon filament yarn and a urethane elastomer yarn which are randomly wound about the rubber tube in combination to form a wound yarn layer. By this, the impact of the ball is absorbed. However, the proportion of the urethane elastomer yarn having good impact absorption in the total of the yarns is small. In addition, the urethane elastomer used has the same quality as a rubber cover for the ball. This merely produces the effect that the rubber cover is slightly increased in amount. Thus, impact force cannot be satisfactorily reduced. Alternatively, Japanese Laid-open Patent Application No. 56-15769 sets out a ball wherein instead of the urethane elastomer yarn used in the above application, there are used a rubber thread and a nylon filament or a combination of a nylon filament and a nylon crimped yarn, which are separately wound about the tube, thereby providing a wound yarn layer. However, this ball is not satisfactory as well with respect to the effect of reducing the impact force, like the ball of the above-mentioned application. It will be noted that the nylon-crimped yarn is one wherein a nylon filament is twisted, thermally set and then untwisted to impart twist strain thereto, or a nylon filament is exerted with a compression force along the axial direction of the filament to cause buckling and is thermally set to impart a zigzag crimp thereto. In both cases, a kind of spring-operated elastomer is imparted to the nylon-crimped yarn. In this connection, however, if the crimped yarn suffers a slight degree of tension during the fabrication or in use, by means of a plurality of guides provided in a yarn winding path, the twist strain or the zigzag crimp is lost. This results in a loss of the spring-operated elasticity, with the original behavior of the nylon filament being undesirably shown. Thus, an expected effect of reducing the impact force or a soft touch has not always been attained. In view of the above, these finished yarns are generically called non-stretchable yarn herein.

Since the impact force is mitigated, the balls in the first to third embodiments are suitable for beginners such as for soft volleyball. However, when athletes make the best use of techniques which require severe use conditions, under which the balls are unsatisfactory with respect to the durability, the balls according to the fourth to sixth embodiments meet this requirement.

SUMMARY OF THE INVENTION

It is an object of the present invention to provide a method for making a ball for sports capable of having reinforcing properties and capable of preventing deforming and swelling even if it is used for a couple of hours and also capable of preventing an anomalous swelling thereof even if the inner pressure thereof exceeds 0.1 Kg/cm$^2$.

It is another object of the present invention to provide a method for making a ball for sports wherein while good durability is maintained, softness is imparted to the ball, so that good durability and good softness which have been heretofore realized only with a sacrifice of either of them can be both imparted to the ball.

It is a further object of the invention to provide a volleyball which is improved in softness while keeping good durability whereby one does not feel a pain on hitting on the fingers or arm.

According to a first embodiment of the invention, there is provided a method for making a ball for sports which comprises providing a round rubber tube, forming a reinforcing layer of a yarn wound about the tube, forming a rubber cover layer formed on the reinforcing layer, and vulcanizing the rubber cover layer to provide a carcass, wherein the reinforcing layer is formed by winding a covered yarn made of a urethane elastomer core thread wound thereabout with a synthetic resin filament.

According to a second embodiment of the invention, there is also provided a method for making a ball for sports which comprises providing a round rubber tube, forming a reinforcing layer of a yarn wound about the tube, and bonding a skin layer on the reinforcing layer by means of a bonding agent, wherein the reinforcing layer is formed by winding a covered yarn made of a urethane elastomer core thread wound thereabout with a synthetic resin filament.

According to a third embodiment of the invention, there is provided a method for making a ball for sports which comprises providing a round rubber tube, forming a reinforcing layer of a yarn wound about the tube, forming a rubber cover layer formed on the reinforcing layer, vulcanizing the rubber cover layer to provide a carcass, and forming a skin layer bonded on the carcass by means of a bonding agent, wherein the wound yarn reinforcing layer is formed by winding a covered yarn made of a urethane elastomer core thread wound thereabout with a synthetic resin filament.

According to a fourth embodiment of the invention, there is provided a method for making a ball for sports which comprises providing a round rubber tube, forming a reinforcing layer of a yarn wound about the tube, forming a rubber cover layer formed on the reinforcing layer, and vulcanizing the rubber cover layer to provide a carcass, wherein the reinforcing layer is formed by winding, in combination, a covered yarn made of a urethane elastomer core thread wound thereabout with a synthetic resin filament and at least one yarn made of a member selected from the group consisting of cotton, polyesters and polyamides (nylons).

According to a fifth embodiment of the invention, there is also provided a method for making a ball for sports which comprises providing a round rubber tube, forming a reinforcing layer of a yarn wound about the tube, and bonding a skin layer on the reinforcing layer by means of a bonding agent, wherein the reinforcing layer is formed by winding, in combination, a covered yarn made of a urethane elastomer core thread wound thereabout with a synthetic resin filament and at least one yarn made of a member selected from the group consisting of cotton, polyesters and polyamides.

According to a sixth embodiment of the invention, there is provided a method for making a ball for sports which comprises providing a round rubber tube, forming a reinforcing layer of a yarn wound about the tube, forming a rubber cover layer formed on the reinforcing layer, vulcanizing the rubber cover layer to provide a carcass, and forming a skin layer bonded on the carcass by means of a bonding agent, wherein the wound yarn reinforcing layer is formed by winding, in combination, a covered yarn made of a urethane elastomer core thread wound thereabout with a synthetic resin filament and at least one yarn made of a member selected from the group consisting of cotton, polyesters and polyamides.

The balls obtained by the above six methods are also within the scope of the invention. The method of the present invention is especially suitable for making volleyballs.

PREFERRED EMBODIMENTS OF THE INVENTION

The method according to the first embodiment of the invention is described. In this embodiment, a round body or tube made of a rubber material is provided, on which a reinforcing layer is formed by winding of the yarns. The reinforcing layer is further covered with a rubber cover. The rubber cover is vulcanized at a temperature of from 150° to 180° C. to obtain a carcass. The rubber cover is made, for example, of natural rubber, styrene butadiene rubber, isobutylene-isoprene rubber, ethylene-propylene-diene terpolymers and the like.

The covered yarn is made of a core yarn such as of a urethane elastomer yarn (a spandex yarn). The core yarn is wound thereabout with a spun yarn or a nylon filament or a polyester filament of the type as set out above at several hundreds to one thousand windings per meter of the core yarn. The core yarn used for this purpose includes a 10 to 500 denier urethane elastomer yarn, which is commercially available, for example, under designation of Obelon from Du Pont De Nemours. The covered yarn may be called stretchable finished yarn in contrast to the aforementioned non-stretchable finished yarn.

In the second embodiment, the reinforcing layer of the covered yarn wound about the round tube is applied with a chloroprene adhesive, through which a skin layer made of a natural or artificial leather is bonded to the reinforcing layer to obtain a so-called leather ball.

Likewise, in the third embodiment of the invention, after the formation of the reinforcing layer, the layer is covered with a rubber. The rubber is vulcanized in a mold at a temperature of from 150° to 180° C. to obtain a carcass as in the first embodiment. The carcass is applied with an adhesive as in the second embodiment, followed by bonding a skin layer such as of a natural, artificial or synthetic leather to obtain a so-called leather ball.

In the first to third embodiments set forth hereinabove, it is important that the reinforcing layer formed on the round tube is made of a covered yarn. The covered yarn includes a urethane elastomer yarn as the core.

In the fourth embodiment, a round tube made of a rubber material is provided, on which a reinforcing layer consisting of two types of yarns is formed by winding of the yarns. The two types of yarns include a covered yarn which will be described in detail hereinafter and a cotton yarn or a polyester or nylon filament. Examples of such polyesters and nylons include those resins commercially available under the designations of TEIJIN TETRON of Teijin Limited, TOYOBO EXTER of Toyobo Co., Ltd., TEIJIN NYLON of Teijin Limited, and TOYOBO NYLON of Toyobo Co., Ltd., and the like. The reinforcing layer is further covered with a rubber cover. The rubber cover is vulcanized at a temperature of from 150° to 180° C. to obtain a carcass. The rubber cover is made, for example, of natural rubber, styrene butadiene rubber, isobutylene-isoprene rubber, ethylene-propylene-diene terpolymers and the like.

Although the reinforcing layer has been stated above as being made of two types of yarns, three or more types of yarns may be used, if necessary. If three or more types of yarns are used, two or more of the cotton yarn, polyester and/or nylon filament are used in addition to the covered yarn in this and fifth to sixth embodiments of the invention.

The covered yarn is made of a core yarn such as of a urethane elastomer yarn (so-called spandex yarn). The core yarn is wound thereabout with a spun yarn or a nylon or polyester filament of the type as set out above at several hundreds to one thousand windings per meter of the core yarn.

The core yarn used for this purpose includes a 10 to 500 denier urethane elastomer yarn, which is commercially available, for example, under the designation of Obelon from Du Pont De Nemours. The covered yarn may be called stretchable finished yarn in contrast to the aforementioned non-stretchable finished yarn.

In the fifth embodiment, the reinforcing layer of the two types of yarns wound about the round tube is applied with a chloroprene or urethane rubber adhesive, through which a skin layer made of a natural or artificial leather is bonded to the reinforcing layer to obtain a so-called leather ball.

Likewise, in the sixth embodiment of the invention, after the formation of the reinforcing layer, the layer is covered with a rubber. The rubber is vulcanized in a mold at a temperature of from 150° to 180° C. to obtain a carcass as in the fourth embodiment. The carcass is applied with an adhesive as in the fifth embodiment, followed by bonding a skin layer such as of a natural, artificial or synthetic leather to obtain a so-called leather ball.

In the fourth to sixth embodiments set forth hereinabove, it is important that the reinforcing layer formed on the round tube is made of at least two types of yarns including a covered yarn and a cotton yarn or a polyester and/or nylon filament. The covered yarn includes a urethane elastomer yarn as the core.

The urethane elastomer yarn has strength higher by 4 to 5 times than rubber yarns for the same yarn count or size, and has an elongation of 500 to 600%. From this, it will be seen that the covered yarn used in the present invention has three characteristic features including a low Young's modulus of elasticity based on the spring effect of the core yarn (urethane elastomer yarn) and the wound yarn (nylon or polyester filament), high strength based on the core yarn in the elastic range, and high strength or high Young's modulus based on the wound yarn being stretched to its full extent outside the elastic range of the low Young's modulus. In order to distinguish the nylon filament used as a winding yarn from the nylon filament being used in combination with the covered yarn and employed in the fourth to sixth embodiments, the former filament is referred to as a winding or wound filament. During the yarn winding step, the covered yarn which is fed to a path covering from a bobbin to the round tube undergoes a tension owing to the frictional resistance at a plurality of guides and a yarn gluing unit which are provided in the path. However, the covered yarn is free of the influence of the tension and can be wound about the tube while keeping the low Young's modulus of elasticity. In this state, the filament windings on the urethane elastomer core yarn are crossed on the round tube, so that the windings are complicatedly entangled without permitting the windings to be loosed or unwound.

According to the first to third embodiments, the winding layer of the covered yarn alone on the round tube is so arranged that the winding filament is complicatedly entangled. This is completely different from a winding layer of an ordinary nylon filament in that the layer has an appropriate degree of elasticity based on the spring effect of the core yarn and the wound yarn and an appropriate degree of reinforcing properties resulting from the wound yarn set in a complicatedly entangled state. Accordingly, the leather ball which is obtained by bonding a natural or artificial leather to the carcass (rubber ball) after application of chloroprene resin adhesives has appropriate degrees of softness and reinforcing properties. As a matter of course, with the ball which has an adhesive directly applied onto the winding layer on which a natural or artificial leather is attached, similar characteristic properties are obtained.

In this connection, however, in order to impart reinforcing properties sufficient to stand use under severe conditions by use of the covered yarn alone, it is necessary to use the yarn being wound in amounts as great as twice or more the amount in ordinary cases, thus being of little merit in practical applications. In the practice of the fourth to sixth embodiments of the invention, the covered yarn is used in combination with a cotton yarn or a polyester or nylon filament in order to realize intended reinforcing properties. More particularly, if the cotton yarn or the filament is used at an appropriate mixing ratio to the covered yarn, controlled reinforcing properties can be obtained.

The ratio by weight of the covered yarn to the total of the covered yarn and the cotton yarn, the polyester and/or nylon filament is generally in the range of from 0.45:1 to 0.85:1, preferably from 0.52:1 to 0.81:1.

Figure 1:
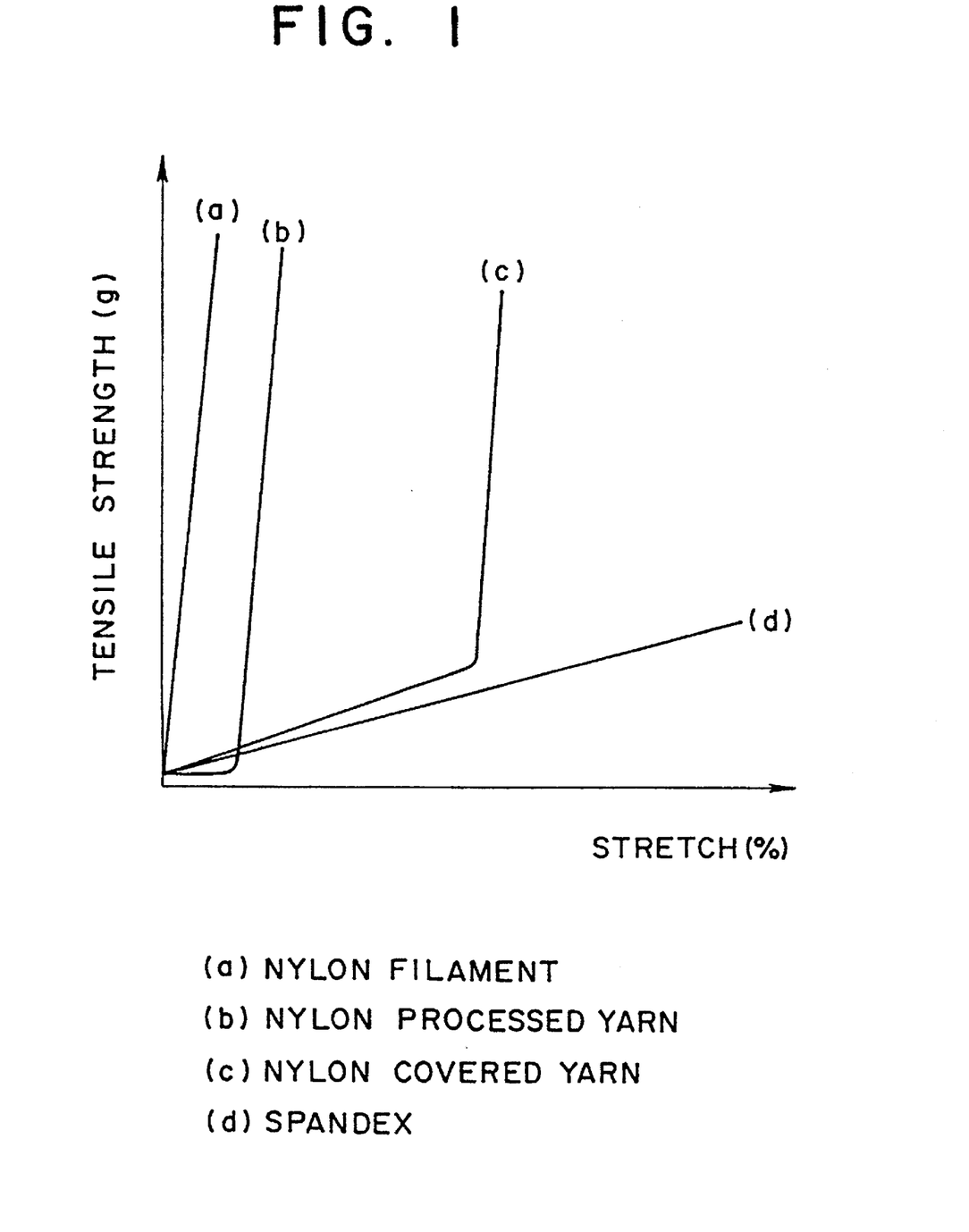
FIG. 1 is a graph schematically showing the relation between the elongation and the tensile strength for different yarns.

Reference is now made to the accompanying drawings. FIG. 1 shows the relation between the elongation and the tensile strength for nylon filament, nylon crimped yarn and nylon covered yarn and spandex. From the figure, it will be seen that the nylon filament has little elongation with high strength. In other words, the nylon filament has a very high Young's modulus. The nylon crimped yarn has a narrow elastic range of low Young's modulus and is small in the tensile strength in that elastic range. This is considered for the reason that the elasticity of the crimped yarn depends only on the spring effect of the crimping strain. Outside the elastic range of the low Young's modulus, the nylon crimped yarn has such a high strength as the nylon filament and has thus a high Young's modulus. As set out hereinbefore, the nylon-covered yarn has a wide elastic range of the low Young's modulus and an appropriate tensile strength in the range. The spandex is elastic but has not such a strength as the nylon filament.

In Table 1, there are shown conditions of making volleyballs according to the first embodiment of the invention and balls for comparison. For making the same conditions for comparison, the nylon filament was used in an equal amount. To this end, the winding time and the number of filaments were properly controlled. The total weights of the volleyballs formed by the spandex alone were made the same. The carcasses and the total weights were, respectively, made as same as possible.

TABLE 1-1

Fabrication Conditions for Balls of the First Embodiment and the Comparative Balls

| Type | A<br>Example 1 | B<br>Example 2 | C<br>Comp.<br>Ex. 1 |
|---|---|---|---|
| Kind of Yarn: | | | |
| core yarn: | stretch yarn<br>spandex 40D | stretch yarn<br>spandex 40D | spandex<br>210D |
| covered yarn: | nylon filament<br>140D | nylon filament<br>70D | |
| numbers of windings of covered yarn: | 400 | 520 | |
| Numbers of Yarns: | 2 | 2 | 2 |
| Winding Time: | 350 seconds | 350 seconds | 350 seconds |
| Weight of Rubber Tube: | 72 g | 72 g | 72 g |
| Weight of Carcass: | 141 g | 126 g | 135 g |

TABLE 1-2

| Type | D Comp. Ex. 2 | E Comp. Ex. 3 | F Prior Art |
|---|---|---|---|
| Kind of Yarn: | nylon filament 100D | processed yarn 100D | |
| Numbers of Yarns: | 2 | 2 | 0 |
| Winding Time: | 350 seconds | 350 seconds | 350 seconds |
| Weight of Rubber Tube: | 72 g | 72 g | 72 g |
| Weight of Carcass: | 131 g | 131 g | 148 g |

Figure 2:
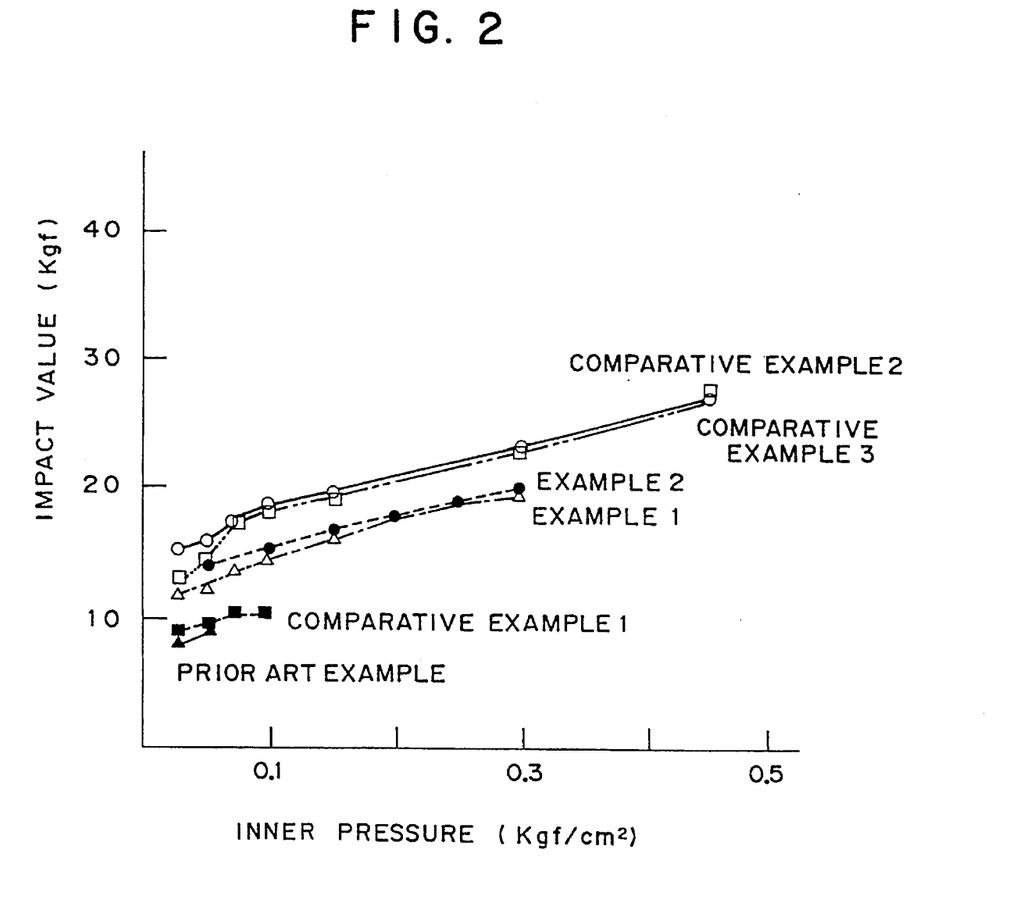
FIG. 2 is a graph schematically showing the relation between inner pressure of soft volleyballs and the impact force for different volleyballs.

The balls obtained under fabrication conditions of the respective examples of the first embodiment and comparative example of the prior art indicated in FIG. 2 were subjected to measurement of an impact value for different inner pressures of balls (hereinafter referred to as inner pressure) wherein the impact value was determined by dropping each carcass from a height of 1 meter. The results can be summarized as follows. The comparative prior art ball is the smallest in the impact value but has not reinforcing properties so that this ball is swollen under the inner pressure of not less than 0.1 Kg/cm$^2$ and is not measurable. As a result, the size of this ball is too large to be suitable for the soft volleyball. The ball of the Comparative Example 1 is soft next to the prior art ball but has not reinforcing properties like the prior art ball and is swollen under the inner pressure of not less than 0.1 Kg/cm$^2$. The impact value of the ball of the Comparative Example 2 sharply drops under the inner pressure near 0.1 Kg/cm$^2$ and is close to that of the ball using covered yarn. This is caused not by the elastic deformation of the normal ball at the time of striking of the ball but by the behavior of the crimping plastic deformation. This is confirmed by the change of the sound from normal sound of pompon to crimping sound under the inner pressure near 0.1 Kg/cm$^2$. In such a state, a suitable repellent elasticity as a ball can not be obtained. Under the inner pressure of more than 0.3 Kg/cm$^2$, the impact value is high and the ball is hard and one feels a pain on hitting on the fingers or arm (this is evaluated by the athletes in the same way and this ball is not suitable for the soft volleyball). The ball of the Comparative Example 3 is substantially the same in the impact value as the ball of the Comparative Example 2. Although the ball of the Comparative Examples 1 and 2 are higher in the impact value than the ball of the Comparative Example 1, this is not the value which does not give any trouble to the athlete so that the athlete feels better compared with the prior art soft ball which the athlete feels indefinite. Furthermore, this ball is preferable since the softness is kept under the inner pressure of not more than 0.3 Kg/cm$^2$ in the practical inner pressure zone.

Figure 3:
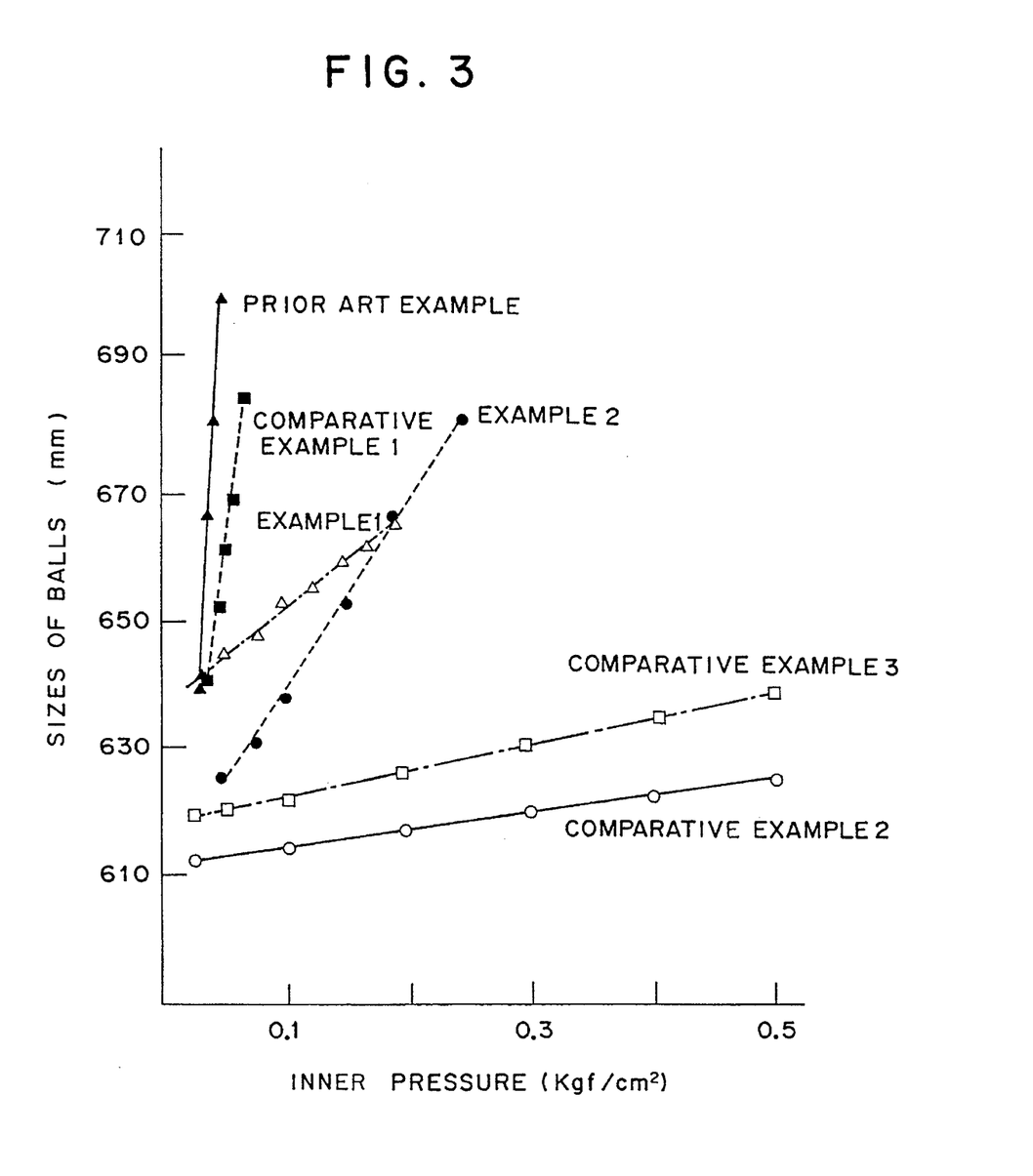
FIG. 3 is a graph schematically showing the relation between inner pressure of the soft volleyballs and sizes for different volleyballs.

The balls of the respective examples of the first embodiment and comparative example of the prior art indicated in FIG. 3 revealed as follows in respect of the interrelation between the inner pressure of the ball and the size of the ball. Since the prior art ball has no reinforcing member, the ball is swollen anomalously and deformed under the inner pressure of not less than 0.1 Kg/cm$^2$. A recommendable inner pressure under which the ball is not swollen is very slight, i.e. ranges from 0.025 to 0.05 Kg/cm$^2$ and is not practically controlled. The spandex in the Comparative Example 1 has the same strength as rubber but does not have a reinforcing effect so that the ball using the spandex is the same as the prior art ball. Nylon filament of the Comparative Example 2 has a sufficient strength as the reinforcing member, which does not cause the ball to swell but harden. The ball of the Comparative Example 3 does only function as nylon filament, which is the same as the Comparative Example 2. In conclusion, the balls of the Comparative Examples 1 and 2 are not swollen excessively under the inner pressure of 0.025 to 0.2 Kg/cm$^2$, hence can be controlled with ease. With respect to the change of the size of the balls with the passage of time, although the prior art ball is out of standard if it is left under the inner pressure of 0.05 Kg/cm$^2$ and 0.07 Kg/cm$^2$, the balls of the first embodiment are within the standard and slightly reduced in the sizes thereof if they are left under the same inner pressures.

In Table 2, there are shown conditions of making volleyballs according to the second and third embodiments of the invention and balls for comparison. For making the same conditions for comparison, the nylon filament was used in an equal amount. To this end, the winding time and the number of filaments were properly controlled. With respect to the spandex, the amount thereof was made the same. The carcasses and the total weights were, respectively, made as same as possible.

TABLE 2-1

Fabrication Conditions for Balls of the Second and Third Embodiments and the Comparative Balls

| Type | A Example 1 | B Example 2 | C Example 3 |
|---|---|---|---|
| Kind of Yarn: | | | |
| core yarn: | stretch yarn spandex 70D | stretch yarn spandex 40D | stretch yarn spandex 40D |
| covered yarn: | nylon filament 140D | nylon filament 70D | nylon filament 25D |
| numbers of windings of covered yarn: | 410 | 520 | 600 |
| Numbers of Yarns: | 2 | 3 | 2 |
| Winding Time: | 625 seconds | 834 seconds | 3500 seconds |
| Amount of Total Nylon Yarns: | 175,000D. sec. | 175,140D. sec. | 175,000D.sec. |
| Weight of Rubber Tube: | 73 g | 74 g | 73 g |
| Weight of Carcass: | 140 g | 151 g | 148 g |
| Total Weight of Yarn: (including bonding agent) | 9 g 6 g (nylon alone) | 25 g 16 g (nylon alone) | 30.5 g 11.7 g (nylon alone) |

TABLE 2-2

| Type | D Comparative Ball | E Prior Art Yarn Wound Ball 1 | F Prior Art Yarn Wound Ball 2 |
|---|---|---|---|
| Kind of Yarn: | spandex 210D | nylon filament 100D | nylon filament 100D stretch yarn 100D spandex 210D |
| Number of Yarns: | 2 | 3 | nylon filament 4 stretch yarn 1 spandex 1 |
| Winding Time: | 378 seconds | 584 seconds | 350 seconds |
| Amount of Total Nylon Yarns: | (158,760D. sec.) | 175,200D. sec. | 175,000D.sec. |
| Weight of Rubber Tube: | 73 g | 73 g | 73 g |
| Weight of Carcass: | 140 g | 145 g | 146 g |

TABLE 2-2-continued

| Type | D Comparative Ball | E Prior Art Yarn Wound Ball 1 | F Prior Art Yarn Wound Ball 2 |
|---|---|---|---|
| Total Weight of Yarn: (including bonding agent) | 11 g | 18 g | 14 g |
|  | 0 g (nylon alone) | 18 g (nylon alone) | 4.1 g (nylon alone) |

Figure 4:
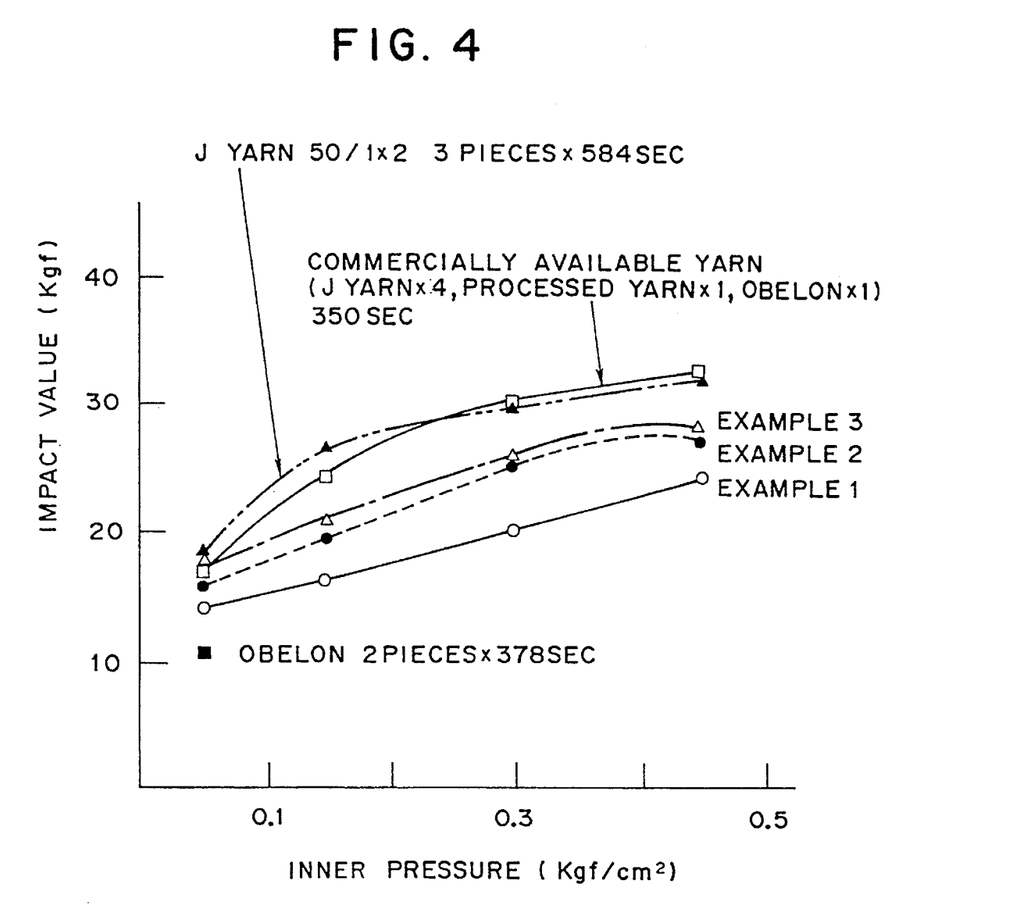
FIG. 4 is a graph schematically showing the relation between inner pressure of carcasses of a No. 4-size volleyball (artificial leather) and the impact force.

The carcasses of No. 4-size balls (artificial leather) obtained according to the second and third embodiments of the invention and the ball of the comparative example of the prior art indicated in FIG. 4 were subjected to measurement of the impact value. The impact value was determined in the first to sixth embodiments by dropping each carcass from a height of 1 meter. The results can be summarized as follows.

1. The impact value increases in proportion to the inner pressure.
2. There is no difference between (1) a prior art yarn wound ball composed of nylon filament having no spandex and processed yarn and (2) a prior art yarn wound ball composed of a nylon filament around which the spandex and the processed yarn are wound. However, the impact value of the balls (1) and (2) sharply drops under the inner pressure near 0.15 Kg/cm$^2$ and is close to that of the ball using covered yarn. This is caused not by the elastic deformation at the time of striking of the ball but by the behavior of the crimping plastic deformation. This is confirmed by the change of the sound from normal sound of pompon to crimping sound under the inner pressure near 0.15 Kg/cm$^2$. In such a state, it is evident that a suitable repellent elasticity as a ball can not be obtained. Accordingly, this ball is not suitable for use in the ball game if the air is let out of the ball in order to mitigate the pain when it hits children.
3. The impact value of the ball using the covered yarn is smaller than the prior art yarn wound balls (1) and (2) and ranges 73 to 87% relative to the latter under the inner pressure of 0.45 Kg/cm$^2$. The athletes feel much the difference of the impact values between the ball using the covered yarn and the prior art yarn wound balls (1) and (2).
4. The impact value of the ball using the covered yarn does not drop sharply and the deformation thereof at the time of striking of the balls does not lose the elastic deformation even if the inner pressure is not more than 0.15 Kg/cm$^2$. Accordingly, the suitable repellent elasticity is maintained as a ball even if the inner pressure is reduced.
5. Although the impact value of the ball using the spandex alone is the smallest, this ball is anomalously swollen if the inner pressure reaches 0.1 Kg/cm$^2$ since it has no reinforcing properties and the impact value thereof can not be measured. The tendency of swelling can be prevented by bonding the artificial leather on this ball.

Figure 5:
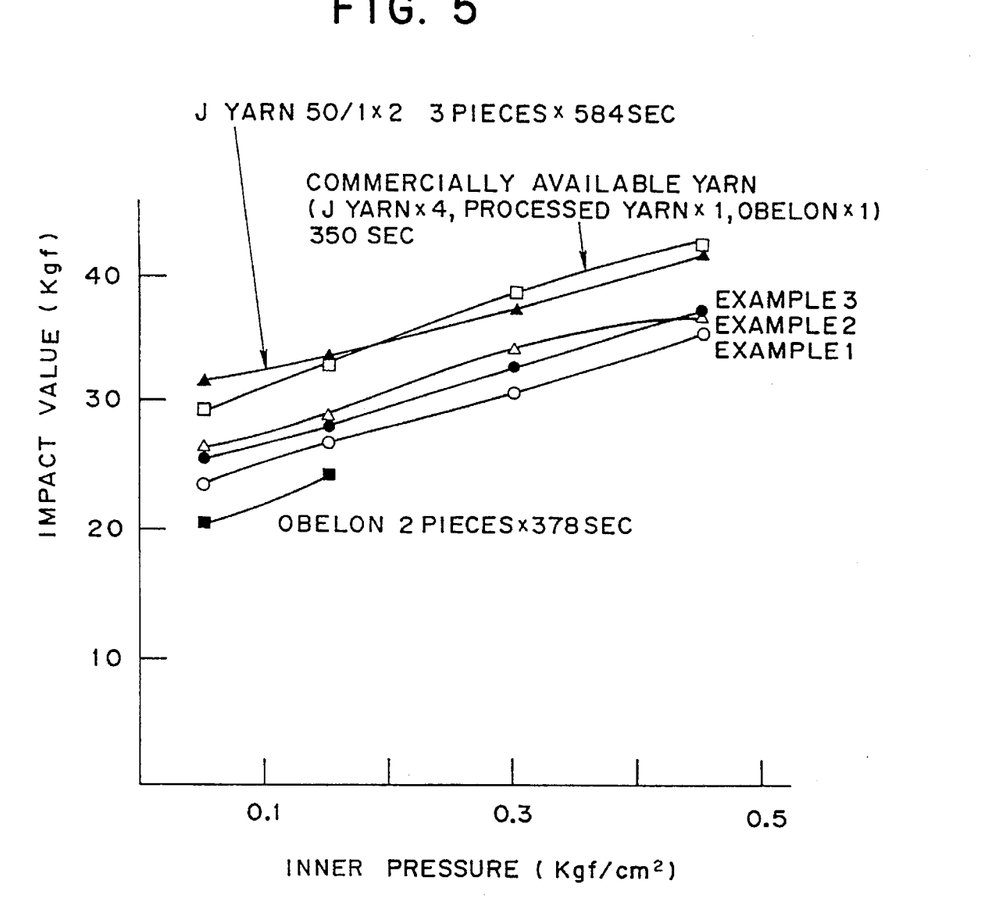
FIG. 5 is a graph schematically showing the relation between inner pressure of the No. 4-size volleyball (artificial leather) and the impact force.
Figure 6:
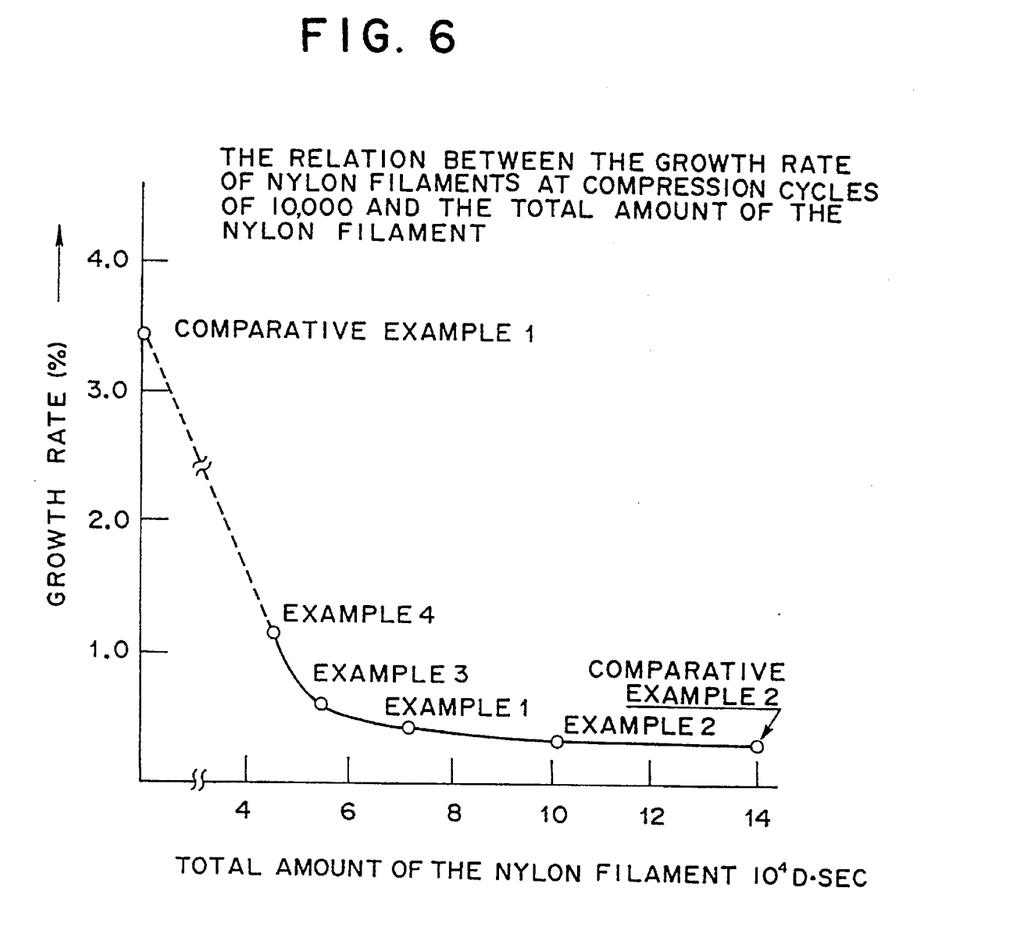
FIG. 6 is a graph schematically showing the relation between the growth rate of nylon filaments at compression cycles of 10,000 and the total amount of the nylon filaments.

The No. 4-size balls obtained according to the second and third embodiments of the invention and the comparative example of the prior art indicated in FIG. 5 were subjected to measurement of the impact value.

1. The impact value increases in proportion to the inner pressure in the same way as the carcass.
2. Although the impact value of the ball is increased in proportion to the increase of the weight due to the artificial leather bonded to the ball, the impact value is not different between the balls of the second and third embodiments. The impact value of the ball using the covered yarn ranges 84 to 87% of the prior art yarn wound balls under the inner pressure of 0.45 Kg/cm$^2$ and the athletes feel much the difference of the impact values therebetween.
3. A sharp drop of the impact value, which occurred in the prior art yarn wound balls under the low inner pressure, is eliminated.
4. Although the impact value of the ball using Obelon alone is the smallest, this ball is swollen excessively under the inner pressure of not less than 0.2 Kg/cm$^2$ and is not suitable as a ball.

In Table 3, there are shown conditions of making No. 4-size volleyballs according to the fourth embodiment of the invention and balls for comparison. For making the same conditions for comparison, the nylon filament and the wound nylon filament were used in an equal amount. To this end, the winding time and the number of filaments were properly controlled. With respect to the covered yarn, since the nylon filaments were wound, the amount of the covered yarn became higher than the amount indicated in Table 3. The carcasses and the total weights were, respectively, made as same as possible.

TABLE 3-1

| | Fabrication Conditions for No. 4 Size Ball | | |
|---|---|---|---|
| Type | A Example 1 | B Example 2 | C Example 3 |
| Kind of Yarn: | | | |
| nylon filament: | 100 D (denier) × 1 | 100 D × 2 | 100D × 1 |
| stretch yarn: | stretch yarn core yarn: spandex 40D × 2 covered yarn winding: nylon filament 70D × 2 | stretch yarn core yarn: spandex 40D × 2 covered yarn winding: nylon filament 70D × 2 | stretch yarn core yarn: spandex 40D × 3 covered yarn winding: nylon filament 70D × 3 |
| stretch yarn: | 220D | 220D | 330D |
| nylon filament: | 100D | 200D | 100D |
| stretch yarn/amount of total yarn spandex | 220/320 = 0.69 — | 220/420 = 0.52 — | 330/430 = 0.77 — |
| Numbers of Yarns or Filaments: | nylon filament 1 stretch yarn 2 | nylon filament 2 stretch yarn 2 | nylon filament 1 stretch yarn 3 |
| Winding Time: | 729.2 seconds | 514.7 seconds | 564.5 seconds |
| Amount of Total | 175008 D.sec. | 174998 D.sec. | 174995 D.sec. |

TABLE 3-1-continued

| | Fabrication Conditions for No. 4 Size Ball | | |
|---|---|---|---|
| Type | A Example 1 | B Example 2 | C Example 3 |
| Nylon Yarns: | | | |
| Weight of Yarns: | 22 g | 13 g | 13 g |
| Weight of Carcass | 143 g | 142 g | 139 g |
| Weight of Ball: | 253 g | 249 g | 241 g |
| Kind of Skin Layer: | natural leather | natural leather | natural leather |

TABLE 3-2

| Type | D Example 4 | E Comp. Ex. 1 | F Comp. Ex. 2 Prior Art |
|---|---|---|---|
| Kind of Yarn: | | | |
| nylon filament: | 100 D × 1 | — | 100 D × 4 |
| stretch yarn: | stretch yarn core yarn: spandex 40D × 4 covered yarn winding: nylon filament 70D × 4 | stretch yarn core yarn: spandex 40D × 3 covered yarn winding: nylon filament 70D × 3 | non-stretch yarn |
| stretch yarn: | 440D | 330D | 0 |
| nylon filament: | 100D | 0 | 400D |
| stretch yarn/amount of total yarn | 440/540 = 0.81 | 330/330 = 1.00 | 0 |
| spandex | — | — | 100 D |
| Numbers of Yarns or Filaments: | nylon filament 1 stretch yarn 4 | nylon filament 0 stretch yarn 3 | nylon filament 2 stretch yarn 1 |
| Winding Time: | 460.5 seconds | 834 seconds | 350 seconds |
| Amount of Total Nylon Yarns: | 174990 D.sec. | 175140 D.sec. | 175000 D.sec. |
| Weight of Yarns: | 22 g | 25 g | 14 g |
| Weight of Carcass: | 143 g | 140 g | 146 g |
| Weight of Ball: | 249 g | 250 g | 254 g |
| Kind of Skin Layer: | natural leather | natural leather | natural leather |

The carcasses obtained under conditions of the respective examples and comparative examples indicated in Table 3 were subjected to measurement of an impact value for different inner pressures wherein the impact value was determined by dropping each carcass from a height of 1 meter. It will be noted that in order to avoid the influence of the difference in weight of the individual carcass samples on measurement of the impact value, the samples were set at the same weight by addition of some weights for more light-weight samples. The results are shown in Table 4.

TABLE 4-1

| | Impact Values of Carcasses | | |
|---|---|---|---|
| Inner Pressure of Ball (Kg/cm$^2$) | A Example 1 | B Example 2 | C Example 3 |
| 0.15 | 21.55 Kgf | 21.45 Kgf | 20.97 Kgf |
| 0.30 | 25.79 Kgf | 25.70 Kgf | 25.24 Kgf |
| 0.45 | 30.57 Kgf | 30.45 Kgf | 28.59 Kgf |

TABLE 4-2

| Inner Pressure of Ball (Kg/cm$^2$) | D Example 4 | E Comp. Ex. 1 | F Comp. Ex. 2 |
|---|---|---|---|
| 0.15 | 20.29 Kgf | 19.76 Kgf | 23.76 Kgf |
| 0.30 | 23.16 Kgf | 24.79 Kgf | 27.23 Kgf |
| 0.45 | 26.93 Kgf | 27.45 Kgf | 31.20 Kgf |

The results of Table 4 can be summarized as follows. A significant difference is seen in the impact value between the balls using the covered yarn, i.e. the balls of Examples 1 to 4 and Comparative Example 1, and the ball using no covered yarn, i.e. the ball of Comparative Example 2. From this, it will be seen that the use of the covered yarn is effective in imparting the softness to the balls. Among the balls using the covered yarn, the impact value increases in the order of Example 4<Comparative Example 1<Example 3<Example 1≈Example 2. The reason why the ball of Comparative Example 1 is greater in the impact value than that of Example 4 is considered due to the fact that the total amounts of the covered yarn are, respectively, 175149 D·second and 128940 D·second. The difference between Examples 1 and 2 are so much smaller that the balls of these examples are considered to be substantially equal with respect to the impact value. In order to check the relation between the fabrication conditions of the respective examples and the softness, the total amount of the nylon filament and the wound nylon filament used in the examples and comparative examples are shown in Table 5.

TABLE 5

| Total Amount of Nylon Filaments | | | | | |
|---|---|---|---|---|---|
| A Example 1 | B Example 2 | C Example 3 | D Example 4 | E Comp. Ex. 1 | F Comp. Ex. 2 |
| 72920 D.second | 102940 D.second | 56450 D.second | 46050 D.second | 0 D.second | 140000 D.second |

Table 5 shows the total amount of nylon filaments which is obtained by multiplying the size (denier: D) of the nylon filaments which are not contained in the covered yarn under fabrication conditions of the respective examples and comparative examples by the winding time (seconds). From this, it will be seen that the total amount increases in the order of Example 4<Example 3<Example 1<Example 2. This order is the same as the order for the softness. This reveals that the impact value of the carcass is proportional to the total amount of the nylon filaments.

The carcasses set out hereinabove are a kind of so-called rubber ball on which no skin layer is attached. Accordingly, the softness can be controlled depending on the total amount of the nylon filaments used.

Table 6 shows the results of impact values of balls, for different inner pressures, in which the carcasses of the examples and comparative examples are each bonded with a natural leather. In this case, the impact value was determined by dropping each ball from a height of 1 meter. The influence of the weight difference of the ball samples is avoided in the same manner as set out before.

TABLE 6-1

Impact Values of Natural Leather-bonded Balls

| Inner Pressure of Ball (Kg/cm$^2$) | A Example 1 | B Example 2 | C Example 3 |
|---|---|---|---|
| 0.15 | 29.64 Kgf | 29.60 Kgf | 28.53 Kgf |
| 0.30 | 34.37 Kgf | 34.33 Kgf | 33.09 Kgf |
| 0.45 | 39.22 Kgf | 39.50 Kgf | 38.84 Kgf |

TABLE 6-2

| Inner Pressure of Ball (Kg/cm$^2$) | D Example 4 | E Comp. Ex. 1 | F Comp. Ex. 2 |
|---|---|---|---|
| 0.15 | 28.16 Kgf | 28.46 Kgf | 29.11 Kgf |
| 0.30 | 30.86 Kgf | 32.56 Kgf | 35.10 Kgf |
| 0.45 | 37.56 Kgf | 37.99 Kgf | 41.33 Kgf |

The results of Table 6 shows a similar tendency as in Table 4. More particularly, the ball of Comparative Example 2 which makes no use of any covered yarn is harder than those balls using the covered yarns. With respect to the balls using the covered yarns, the impact value or hardness increases with an increasing total amount of the nylon filaments. The reason why the ball of Comparative Example 1 which does not contain any nylon filament is harder than the ball of Example 4 having the smallest amount of the nylon filament is as stated hereinbefore. That is, the ball of Example 4 has a great amount of the covered yarn.

Table 7 show the results of a ball growth rate which is determined by a repeating compression test to check the durability of the ball. The repeating compression test is a durability test wherein a ball to be tested is continuously mechanically compressed to an extent of ⅓ (33%) of the diameter of the ball. At a predetermined cycle of the mechanical compression, the circumference of the ball is measured and a ratio of the circumference to a circumference prior to the test, i.e. a growth rate, is calculated to judge the durability of the ball.

The interrelation between the growth rate obtained above and the durability in practical use has been proven, i.e. a greater growth rate results in poorer durability.

TABLE 7-1

Durability Test Using A Repeating Compression Testing Machine

| | Growth Rate % | | |
|---|---|---|---|
| Compression Cycle | A Example 1 | B Example 2 | C Example 3 |
| 5000 | 0.35 | 0.36 | 0.52 |
| 10000 | 0.47 | 0.43 | 0.63 |
| 20000 | 0.58 | 0.55 | 0.94 |

TABLE 7-2

| | Growth Rate (%) | | |
|---|---|---|---|
| Compression Cycle | D Example 4 | E Comp. Ex. 1 | F Comp. Ex. 2 |
| 5000 | 0.77 | 1.28 | 0.33 |
| 10000 | 1.23 | 3.34 | 0.42 |
| 20000 | 1.54 | broken | 0.48 |

The durability is described with reference to the results of Table 7. The growth rate increases proportionally to the compression cycle. The degree of the increase depends on the fabrication conditions. The growth rate of the ball of Comparative Example 2 is smallest and has thus the best durability. On the other hand, the growth rate of the ball of Comparative Example 1 is greatest and is thus poorest in the durability. Since the ball of Comparative Example 1 has not good durability, it was bursted at the 15000th compression cycle. From this, it will be appreciated that the ball of Comparative example 1 is suitable for soft volleyball game but is not suitable for ordinary volleyball match. The balls of the examples and comparative examples may be arranged in a higher order of the growth rate, i.e. in the order of the durability being lower to higher, as follows.

Comparative Example 1<Example 4<Example 3<Example 1<Example 2<Comparative Example 2

This order is the same as the orders of the impact values of the carcasses and bonded balls set out hereinbefore.

In order to make the interrelation of the orders, the relation between the growth rate at the 10000th compression cycle and the total amount of the nylon filaments is shown in FIG. 7. It will be noted why the 10000th compression cycle is used for comparison is that the ball of Comparative Example 1 is bursted at the 15000th cycle.

From FIG. 7, it will be seen that as the total amount of the nylon filaments increases, the growth rate is abruptly lowered and comes to a given level at $10\times10^4$ D·second or higher.

The ball of Comparative Example 2 is a commercially available one and has a growth rate of 0.42% at the 10000th cycle. Such a growth rate has been already proven as being of no practical problem. The balls of Examples 1 and 2 are substantially equal to that of Comparative Example 2.

In general, if the growth rate is not higher than 1%, no problem is presented in practical use. More particularly, No. 4 (5) volleyball has been standardized as having a circumference of 62 to 64 cm (65 to 67 cm) with a center value of 63 cm (66 cm). The ball fabricated at the center value has a circumference of 63.6 cm (66.6 cm) after growth by 1%. Such a variation in the circumference has not presented any problem in practical use, thereby not causing any deformation of the ball.

Gathering the foregoing, the following conclusions are obtained.

1. Balls using a covered yarn alone have good softness but are poor in durability. Accordingly, such a ball is suited for the purposes which do not require substantial durability, or for soft volleyball game. However, because of the small durability, the ball is not suitable for general volleyball match.
2. Balls using nylon filaments alone have good durability, with a problem on softness.
3. Use of both nylon or other filaments and the covered yarn according to the invention is effective in balancing the durability and softness when the ratio between the filaments and the covered yarn is appropriately controlled. A desire level of softness can be achieved by controlling the ratio.

The soft volleyball according to the first embodiment having the arrangement as set forth above is not swollen excessively under the practical inner pressure of 0.025 to 0.2 Kg/cm$^2$ so that the inner pressure thereof can be controlled with ease and the change of the size of the ball with the passage of time is not out of standard and the size of the ball is rather reduced due to the elasticity of the covered yarn when it is left as it is.

The impact value of the soft volleyball bonded with the leather according to the second and third embodiments ranges 84 to 87% relative to that of the prior art yarn wound ball and the athletes remarkably feel the softness of this ball.

According to the fourth to sixth embodiments, it is possible to realize the durability and softness at the same time which were considered difficult so far since the softness can be given to the ball while the durability is maintained by the ratio between the mixed wound nylon filament and the covered yarn.

What is claimed is:

1. A method for making a ball for sports which comprises providing a round rubber body, forming a reinforcing layer of a covered yarn wound about the body, forming a rubber cover layer formed on the reinforcing layer, and vulcanizing the rubber cover layer to provide a carcass, wherein said covered yarn is made of a urethane elastomer core thread which is wound thereabout with a synthetic resin filament.

2. A method according to claim 1, wherein said synthetic resin filament is a polyamide filament.

3. A method according to claim 1, wherein said synthetic resin filament is a polyester filament.

4. A method according to claim 1, wherein said reinforcing layer includes a second yarn wound in combination with the covered yarn, the second yarn being made of a polyamide.

5. A method according to claim 1, wherein said reinforcing layer includes a second yarn wound in combination with the covered yarn, the second yarn being made of a polyester.

6. A method according to claim 1, including forming a skin layer bonded on the carcass by means of a bonding agent.

7. A method according to claim 1, wherein the reinforcing layer is formed by winding said covered yarn, which is made of a urethane elastomer core thread wound thereabout with a synthetic resin filament, in combination with at least a second yarn made of a member selected from the group consisting of cotton, polyesters and polyamides.

8. A method according to claim 7, wherein a ratio by weight of said covered yarn and the total of said covered yarn and said at least second yarn is in the range of 0.45:1 to 0.85:1.

9. A method for making a ball for sports which comprises providing a round rubber body, forming a reinforcing layer of a covered yarn wound about the body, and bonding a skin layer on the reinforcing layer by means of a bonding agent, wherein said covered yarn is made of a urethane elastomer core thread wound thereabout with a synthetic resin filament.

10. A method according to claim 9, wherein said synthetic resin filament is a polyamide filament.

11. A method according to claim 9, wherein said synthetic resin filament is a polyester filament.

12. A method according to claim 9, wherein said reinforcing layer includes a second yarn wound in combination with the covered yarn, the second yarn being made of a polyamide.

13. A method according to claim 9, wherein said reinforcing layer includes a second yarn wound in combination with the covered yarn, the second yarn being made of a polyester.

14. A method according to claim 7, wherein the reinforcing layer is formed by winding said covered yarn, which is made of a urethane elastomer core thread wound thereabout with a synthetic resin filament, in combination with at least a second yarn made of a member selected from the group consisting of cotton, polyesters and polyamides.

15. A method according to claim 14 wherein a ratio by weight of said covered yarn and the total of said covered yarn and said at least second yarn is in the range of 0.45:1 to 0.85:1.

16. A method for making a ball for sports which comprises providing a round rubber body, forming a reinforcing layer of a covered yarn wound about the body, forming a rubber cover layer formed on the reinforcing layer, vulcanizing the rubber cover layer to provide a carcass, and forming a skin layer bonded on the carcass by means of a bonding agent, wherein the wound yarn reinforcing layer is formed by winding said covered yarn, which is made of a urethane elastomer core thread wound thereabout with a synthetic resin filament, in combination with at least a second yarn made of a member selected from the group consisting of cotton, polyesters and polyamides.

17. A method according to claim 16, wherein a ratio by weight of said covered yarn and the total of said covered yarn and said at least second yarn is in the range of 0.45:1 to 0.85:1.

* * * * *

UNITED STATES PATENT AND TRADEMARK OFFICE
CERTIFICATE OF CORRECTION

PATENT NO. : 5,597,432
DATED : January 28, 1997
INVENTOR(S) : Hideomi Shishido et al It is certified that error appears in the above-indentified patent and that said Letters Patent is hereby corrected as shown below:

Column 16, line 30; change "claim 7," to ---claim 9,---.
Column 16, line 36; change "claim 14" to ---claim 14,---.

Signed and Sealed this

Tenth Day of June, 1997

BRUCE LEHMAN

Attest:

Attesting Officer

Commissioner of Patents and Trademarks